April 21, 1925.   1,534,340
D. M. BERNOTOW
DEVICE FOR REGULATING HUMIDITY OF CONTAINERS
Filed Jan. 25, 1923
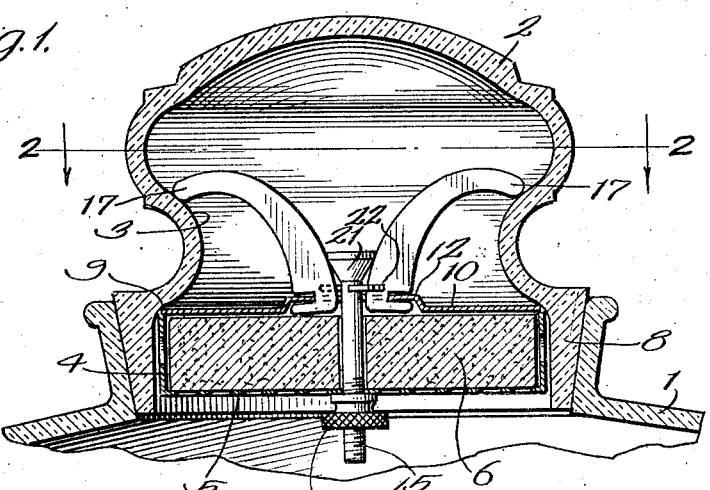
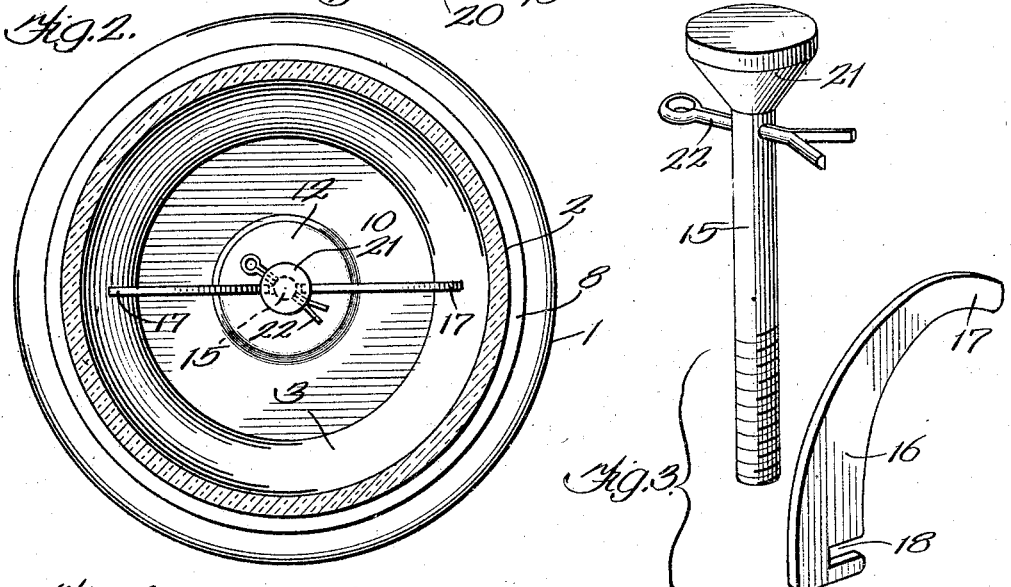
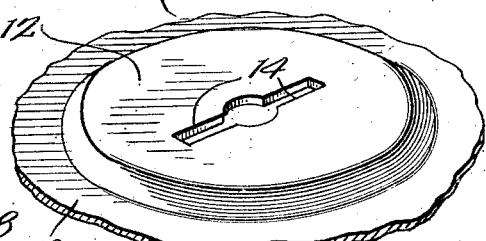
Inventor:
Dominik M. Bernotow
By Cheever & Cox Attys Patented Apr. 21, 1925.

1,534,340

UNITED STATES PATENT OFFICE.

DOMINIK M. BERNOTOW, OF CHICAGO, ILLINOIS, ASSIGNOR TO BUNTE BROTHERS, OF CHICAGO, ILLINOIS, A CORPORATION OF ILLINOIS.

DEVICE FOR REGULATING HUMIDITY OF CONTAINERS.

Application filed January 25, 1923. Serial No. 614,923.

*To all whom it may concern:*

Be it known that I, DOMINIK M. BERNO-TOW, a citizen of the United States, residing at Chicago, in the county of Cook and State of Illinois, have invented a certain new and useful Improvement in Devices for Regulating Humidity of Containers, of which the following is a specification.

My invention relates to devices for regulating the humidity of containers, such as humidors, in which case the atmosphere is to be kept moist, or candy jars, in which it is to be kept dry. For convenience the present illustrations may be regarded as representing a candy jar. The object of the invention is to provide a simple and easily operated holder for some substance which will regulate the humidity, and in the illustrated form the device consists of a receptacle for calcium chloride or other drier, and means whereby the device may be readily attached to and detached from the chambered stopper of the jar. I attain my object by the mechanism illustrated in the accompanying drawings, in which,—

Fig. 1 is an assembly view, chiefly in sectional elevation, showing my device in position in the stopper of the jar.

Fig. 2 is a plan section on the line 2—2 of Fig. 1.

Fig. 3 is a distributive view showing a portion of the slotted cover of the holder, one of the supporting arms, and the center rod which controls the position of the supporting arms.

Fig. 4 is a view of the pad holder and supporting arms, showing the same in inverted position—the most convenient one for introducing the holder into the stopper.

Like numerals denote like parts throughout the several views.

In the selected design, the jar 1 has a stopper 2 which fits into it, the stopper being chambered and having an internal annular shoulder or convergent portion 3 which is utilized to keep the holder in place. The holder itself consists of a receptacle 4 having a foraminated bottom 5 which supports the substance 6 by which the moisture of the air within the container is absorbed. Calcium chloride is one of the chemicals commonly used for the purpose, and for convenience this may be in the form of a pad, as illustrated. For convenience it may be referred to as a pad of absorbent material, although it will be understood that a moisture-imparting substance could be substituted in case it is desired to use the container as a humidor for cigars or tobacco.

The holder 4, mentioned, is circular in outline and of such diameter and height as to fit freely within the lower flange 8 of the stopper. The pad holder has a cover 10, which is here shown to be of sheet-metal with its central portion 12 pressed upward to form a boss of moderate elevation. This has a slot 14, best shown in perspective in Fig. 3. This slot is enlarged at the middle for accommodating the center rod 15, whose function will be presently described.

The device has two supporting arms 16 which are curved in the manner illustrated, the outer ends 17 forming fingers adapted to rest upon the shoulder 3 previously described. A horizontal slot 18 is formed in the outer edge of each of the arms near the inner end.

The parts are so constructed and arranged that when assembled the arms will be inserted into slot 14 in cover 10 and then moved radially outward so that the metal of the cover will enter the slots 18 and form an articulate connection between the arms and the cover. It will be understood that the purpose is to hinge the arms to the cover, and while I have illustrated an inexpensive and efficient design for the purpose, other designs may be substituted with like ultimate effect. One of the advantages of my construction is that the arms may be made of stamped metal, and no configurating is necessary in addition to the action of blanking dies.

The position of the supporting arms is controlled by a center rod 15 previously mentioned. This passes through the pad holder and is threaded at the lower end to take a nut 20. The upper end of the rod has an enlarged head 21. This forms a spreader for wedging the arms apart and holding them in acting position, as will be subsequently explained. It is desirable to insert a cotter pin 22, or cross rod of some kind, in the center rod beneath head 21 to prevent it from rotating in the holder when the nut 20 is rotated. It will be evident, by referring to Figs. 1 and 2, that if the rod rotates, the cotter pin will move into contact with the side of one of the arms 16, which will prevent further rotation, but this will have no effect to dislodge or present the proper functioning of the arms.

In practice, when it is desired to introduce a holder of this design into the stopper, the holder is held upside down, as shown in Fig. 4, and the nut 20 is backed off so as to lower the head 21. This permits the arm 16 to drop down to a more nearly vertical position, with the result that their tips or fingers 17 swing to a point nearer the axis of the holder. The distance from tip to tip of the arms is then less than the diameter of the narrowest part of the neck of the stopper, and hence the holder may be readily lowered into the stopper until it comes to rest upon the shoulder 9 near the mouth of the stopper. The operator then rotates nut 20 so as to draw the head 21 of center rod 15 toward the holder. This causes the head to force the arms apart, with the result that the tips move outward and engage the shoulder 3 within the stopper. The stopper may then be turned right side up again to the position shown in Fig. 1, and the device is ready for use.

When the pad has absorbed about as much moisture as it is capable of doing, it may be removed and baked, or a fresh pad may be substituted. The removing operation is the reverse of the one described, although for a removal of the holder from the stopper of the jar it is not necessary that the stopper be turned upside down. It may be held right side up. By backing off nut 20, the head 21 may be raised, and the weight of the holder and contents will then cause the arms to collapse or move towards each other sufficiently to permit the fingers to pass out through the neck of the stopper.

It will be noted that the action is positive and does not depend on springs or friction devices for keeping the holder fast to the stopper.

Having thus described my invention, what I claim as new and desire to secure by Letters Patent is:

1. A device of the character described, comprising a receptacle adapted to contain a moisture-regulating substance, rigid arms articulately connected to said receptacle and adapted to swing into and out of the chambered portion of an internally chambered stopper, a rod passing up through the receptacle and between the arms, and a head at the upper end of the rod between and overlying a portion of the arms, adapted when drawn downward to wedge the arms apart and thereby force them outward into the chambered portion of the stopper.

2. A device of the character described, comprising a receptacle adapted to contain a moisture-regulating substance, the receptacle having a cover, rigid arms pivoted to the cover and adapted to interengage with the cover for producing an articulate connection between the arms and the cover, a threaded rod passing up through the receptacle and between the arms, a head at the upper end of the rod between and overlying a portion of the arms, and a nut for drawing downward on the rod for causing the head to lock the arms in spread position.

3. A receptacle for containing a moisture-regulating substance, said receptacle having flat arms arranged in radial planes, said arms having fingers at the upper end adapted to enter into the chamber of a chambered stopper, the receptacle having a cover provided with slots running radially for receiving the lower end of the arms, said arms being notched at the outer edge for interengagement with the cover, a center rod having a head which is interposed between the arms and overlies a portion thereof, and means for locking said head in lowered position to thereby lock the arms in spread position to thereby project the fingers into the chamber of the stopper.

4. A device of the character described, comprising a receptacle adapted to contain a moisture-regulating substance, rigid arms articulately connected to said receptacle and extending radially upward and outward, a rod passing up through the receptacle and having a head at the upper end lying between and over a portion of said arms for locking the latter apart when the head is drawn downward, the rod being threaded at the lower end, and a nut on the lower end of the rod adapted to engage the bottom of the receptacle for anchoring the rod, the rod having a projection adapted to engage the side of one of the arms for limiting the rotation of the rod when the nut is rotated.

In witness whereof I have hereunto subscribed my name.

DOMINIK M. BERNOTOW.